(12) United States Patent
Chen

(10) Patent No.: US 11,738,825 B2
(45) Date of Patent: Aug. 29, 2023

(54) POWER PEDAL

(71) Applicant: WELLGO PEDAL'S CORP., Taichung (TW)

(72) Inventor: Chun-Rong Chen, Taichung (TW)

(73) Assignee: WELLGO PEDAL'S CORP., Taichung (TW)

( * ) Notice: Subject to any disclaimer, the term of this patent is extended or adjusted under 35 U.S.C. 154(b) by 0 days.

(21) Appl. No.: 17/968,099

(22) Filed: Oct. 18, 2022

(65) Prior Publication Data

US 2023/0131391 A1    Apr. 27, 2023

(30) Foreign Application Priority Data

Oct. 22, 2021   (TW) .................................. 110212446

(51) Int. Cl.
*B62M 3/08* (2006.01)
*B62J 45/421* (2020.01)
*B62J 45/411* (2020.01)

(52) U.S. Cl.
CPC ............ *B62M 3/083* (2013.01); *B62J 45/421* (2020.02); *B62J 45/411* (2020.02)

(58) Field of Classification Search
CPC ....... B62M 3/083; B62J 45/421; B62J 45/411
See application file for complete search history.

(56) References Cited

U.S. PATENT DOCUMENTS

| | | | | |
|---|---|---|---|---|
| 2005/0275561 A1* | 12/2005 | Kolda | ................... | B60B 27/023 340/870.07 |
| 2014/0165779 A1* | 6/2014 | Chen | ...................... | B62J 45/421 74/594.4 |
| 2014/0202262 A1* | 7/2014 | Mercat | ................... | B62J 45/423 73/862.338 |
| 2014/0273543 A1* | 9/2014 | Hanshew | ................ | G01L 3/108 439/18 |
| 2016/0052584 A1* | 2/2016 | Sasaki | ....................... | G01L 3/24 74/594.4 |

FOREIGN PATENT DOCUMENTS

| | | | | |
|---|---|---|---|---|
| DE | 202018005992 U1 * | 5/2019 | ............. | B62M 3/08 |
| WO | WO 2021028845 A1 * | 2/2021 | ............ | B62J 45/411 |

OTHER PUBLICATIONS

Machine translation of DE 202018005992 U1, Favero Electronics S.r.l., Sep. 5, 2019 (Year: 2019).*

* cited by examiner

*Primary Examiner* — Vinh Luong

(74) *Attorney, Agent, or Firm* — Muncy, Geissler, Olds & Lowe, P.C.

(57) ABSTRACT

A power pedal is provided, including: a shaft, including a first end configured to be assembled to a bicycle crank, a second end and a connection section connected between the first end and the second end, the connection section including a strain sensing module; a pedal body, connected to the second end; a power sensor, including a processing module and a shell member, the processing module being disposed on an outer circumferential wall of the connection section, the processing module including a processing unit and a wireless transmission unit electrically connected to each other, the processing unit being electrically connected to the strain sensing module, the shell member being disposed on the connection section and encompassing the processing module, the shell member including a receiving room, the receiving room being configured to receive a battery which is replaceable and electrically connected to the processing unit.

8 Claims, 4 Drawing Sheets

POWER PEDAL

BACKGROUND OF THE INVENTION

Field of the Invention

The present invention relates to a power pedal.

Description of the Prior Art

In order to effectively quantify the training effect during training, a power meter that can calculate the pedal force of the rider is used. The conventional power meter includes a strain gauge and a signal transmitter. The conventional power meter is installed on the pedal body or crank. As the strain gauge installed on the pedal body or crank is stressed, the power meter calculates the power and transmits the power signal to the display device through the signal transmitter for the rider's reference.

However, since the conventional power meter is installed on the pedal body, it will greatly increase the volume of the pedal body and affect the riding experience of the rider, and the conventional design of the power meter installed on the crank is easy to be damaged due to external collisions.

In addition, a lithium battery is generally applied to power the conventional power metered; however, the lithium battery has the problem of recharge life. When the lithium battery degrades and needs to be replaced, it needs a destructive way to dismantle the lithium battery. As a result, the pedal and the crank need to be replaced when the lithium battery is replaced.

The present invention is, therefore, arisen to obviate or at least mitigate the above-mentioned disadvantages.

SUMMARY OF THE INVENTION

The main object of the present invention is to provide a power pedal, which can effectively reduce the overall volume to improve the riding comfort, and can avoid the impact of foreign objects to have a long service life.

To achieve the above and other objects, a power pedal is provided, including: a shaft, including a first end, a second end and a connection section connected between the first end and the second end, the first end being configured to be assembled to a bicycle crank, the connection section including a strain sensing module; a pedal body, connected to the second end; a power sensor, including a processing module and a shell member, the processing module being disposed on an outer circumferential wall of the connection section, the processing module including a processing unit and a wireless transmission unit electrically connected to each other, the processing unit being electrically connected to the strain sensing module, the shell member being disposed on the connection section and encompassing the processing module, the shell member including a receiving room, the receiving room being configured to receive a battery which is replaceable and electrically connected to the processing unit.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
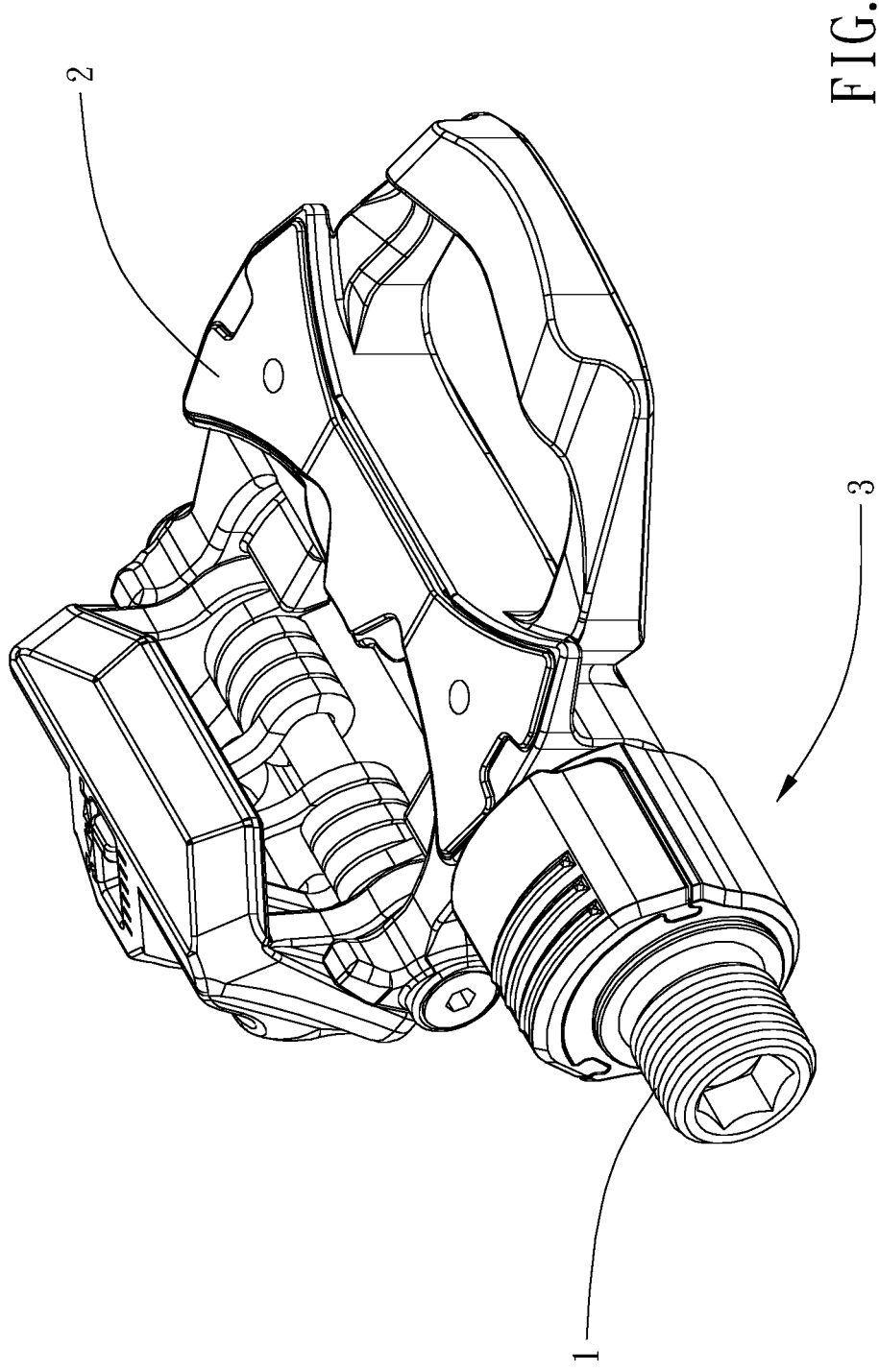
FIG. 1 is a stereogram of a preferable embodiment of the present invention.
Figure 2:
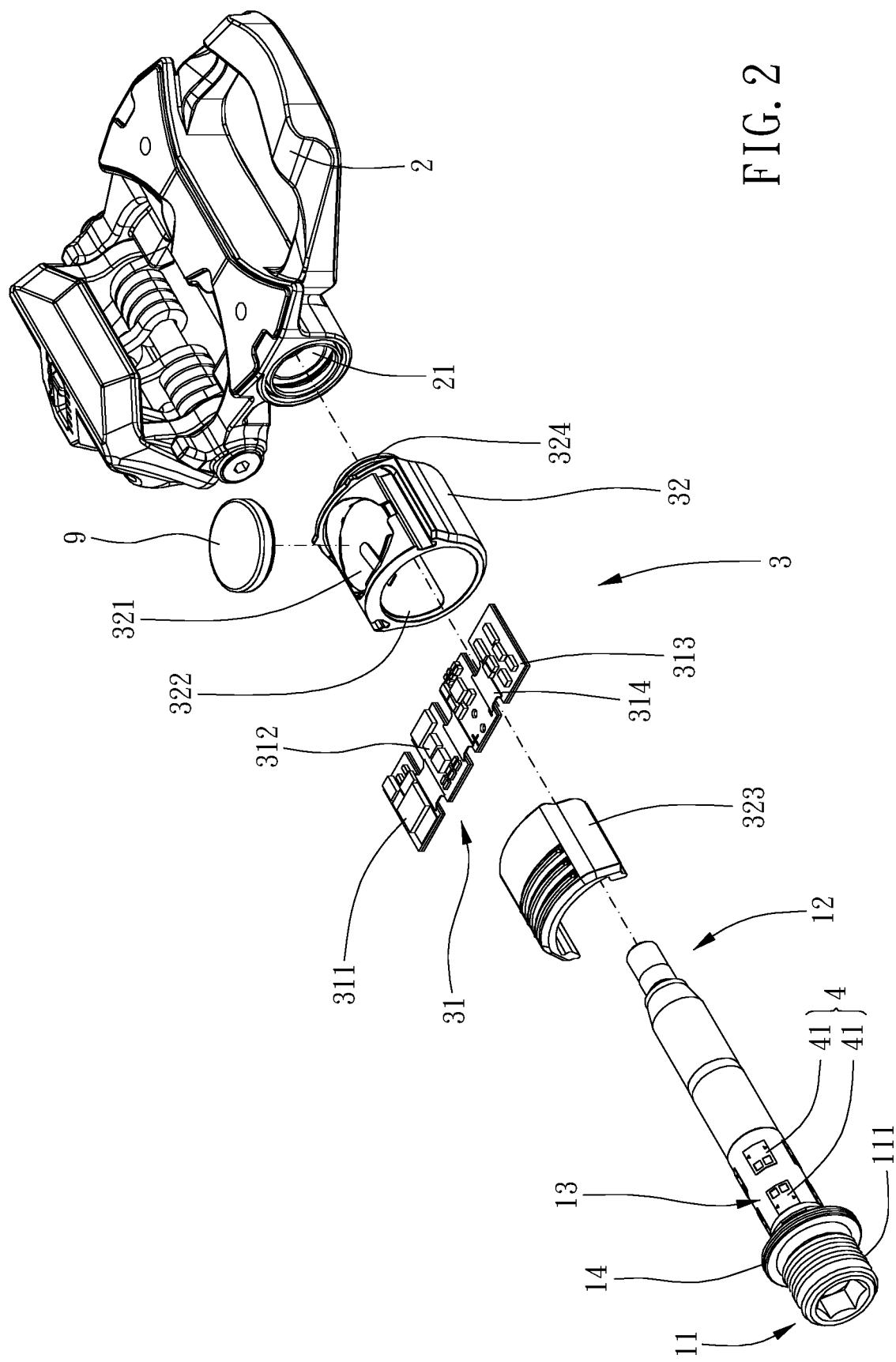
FIG. 2 is a breakdown drawing of a preferable embodiment of the present invention.
Figure 3:
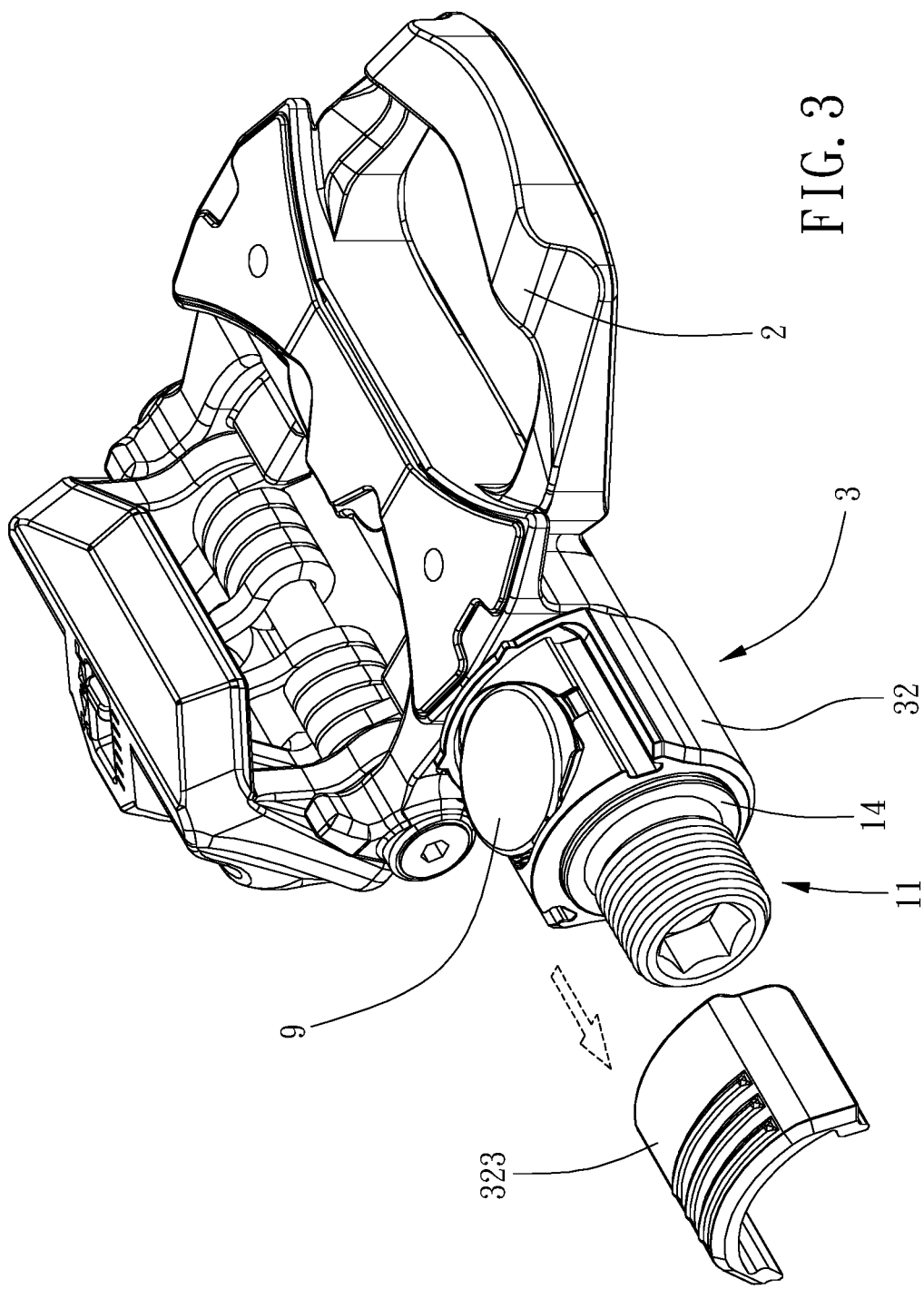
FIG. 3 is another stereogram of a preferable embodiment of the present invention.
Figure 4:
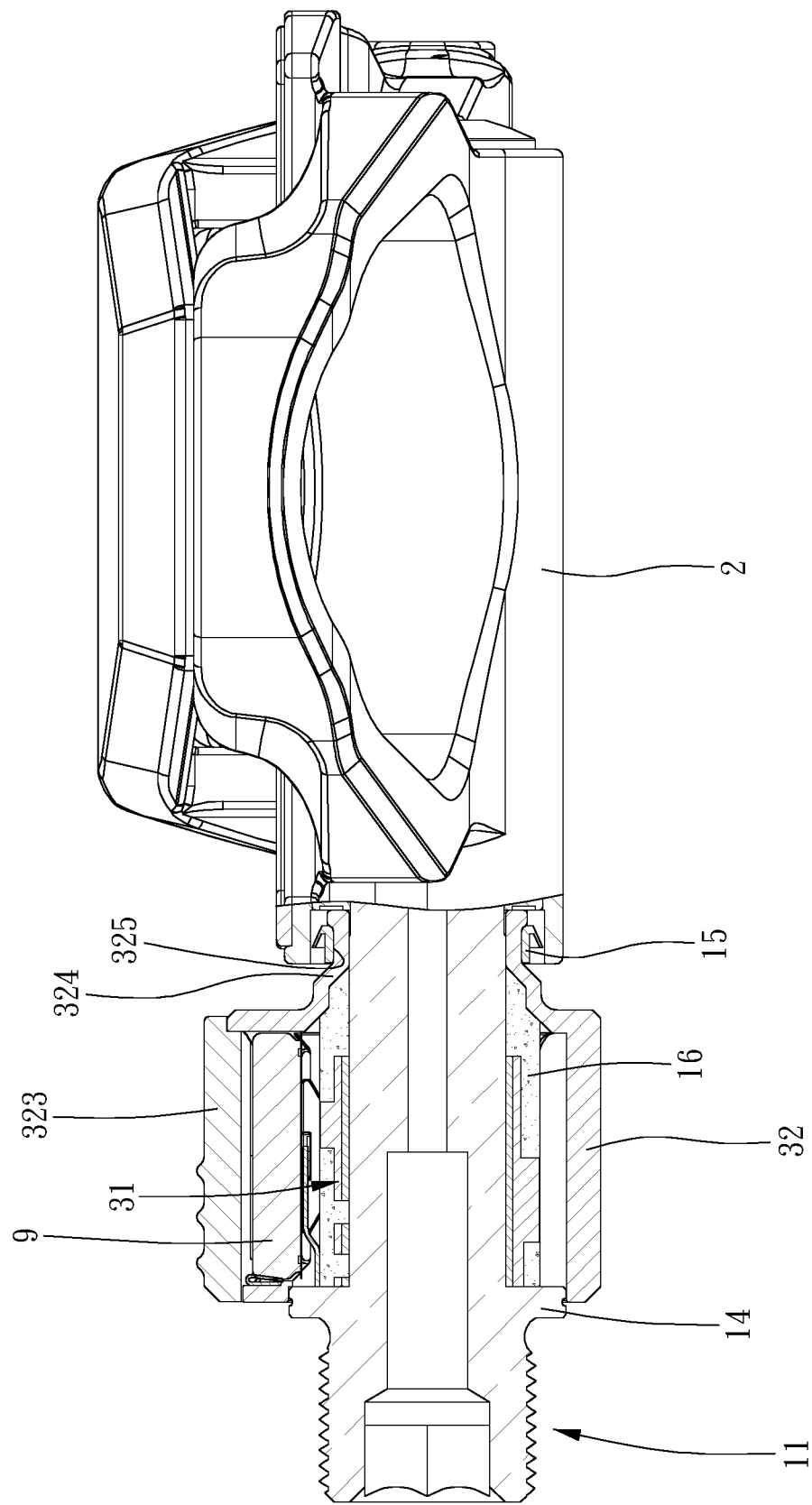
FIG. 4 is a cross-sectional view of a preferable embodiment of the present invention

Please refer to FIGS. 1 to 4 for a preferable embodiment of the present invention. A power pedal of the present invention includes a shaft 1, a pedal body 2 and a power sensor 3.

The shaft 1 includes a first end 11, a second end 12 and a connection section 13 connected between the first end 11 and the second end 12, the first end 11 is configured to be assembled to a bicycle crank (not shown), and the connection section 13 includes a strain sensing module 4.

The pedal body 2 is connected to the second end 12.

The power sensor 3 includes a processing module 31 and a shell member 32, the processing module 31 is disposed on an outer circumferential wall of the connection section 131, the processing module 31 includes a processing unit 311 and a wireless transmission unit 312 electrically connected to each other, and the processing unit 311 is electrically connected to the strain sensing module 4. The shell member 32 is disposed on the connection section 13 and encompasses the processing module 31, the shell member 32 includes a receiving room 321, and the receiving room 321 is configured to receive a battery 9 which is replaceable and electrically connected to the processing unit 311. When the strain sensing module 4 detects that the strain variation on the shaft 1 occurs, the strain sensing module 4 transmits an associated signal to the processing unit 311 for calculating, and the processing unit 311 transmits the calculated signal to a display unit (such as a monitor installed on a handle bar of a bicycle, or a smartphone) via the wireless transmission unit 312, so that the user can read the power data to know the training effect.

Since the power sensor 3 is disposed on the outer circumferential wall of the connection section 13 and between the pedal body 2 and the bicycle crank, the pedal body 2 can be made with small size and weight; since the battery 9 is replaceable, it is convenient for replacement.

Specifically, the processing module 31 further includes at least one circuit board 313, and the processing unit 311 and the wireless transmission unit 312 is disposed on the at least one circuit board 313. The at least one circuit board includes a plurality of circuit boards 313, neighboring two of the plurality of circuit boards 313 are connected by a cable 314, and the plurality of circuit boards 313 are disposed around the connection section 13. The cable 314 is flexible so that the plurality of circuit boards 313 can be disposed around the connection section 13 and electrically connected to each other.

Specifically, one of the plurality of circuit boards 313 is configured to be electrically connected to the battery 9, and another one of plurality of circuit boards 313 is electrically connected to the strain sensing module 4, wherein the battery 9 provides the power to elements on the plurality of circuit boards 313 to work. In this embodiment, the strain sensing module 4 includes a plurality of strain gauges 41, and the plurality of strain gauges 41 are disposed on the connection section 13, which improves the precision of detection.

Preferably, the shell member 32 is annular for matching the shaft 1 and the processing module 31, and the shell member 32 includes a sleeving hole 322, the sleeving hole 322 is disposed around the processing module 31 and the connection section 13. An outer circumferential wall of the shell member 32 includes the receiving room 321, the receiving room 321 includes a cover 323 which is detachable, and the battery 9 is a button battery which is thin and light, and easy to purchase and replace. In this embodiment, the cover 323 is disposed on the shell member 32 and slidable in the direction in which the shaft 1 extends, and the cover 323 can be limited by the pedal body 2 and the bicycle crank so that the cover 323 cannot disengage from the shell member 32.

In this embodiment, the first end 11 includes an outer thread 111, the outer thread 111 is configured to be screwed to the bicycle crank, the shaft 1 includes a flange 14 extending radially and between the connection section 13 and the first end 11, and an end of the shell member 32 is radially abutted against the flange 14. The flange 14 can prevents the processing module 31 and the shell member 32 from moving toward the first end 11 to contact the bicycle crank.

Preferably, an end of the shell member 32 remote from the first end 11 includes a tapered end 324, the pedal body includes a shaft hole 21 in which the second end 12 is inserted so that the pedal body is rotatable relative to the second end 12, and the tapered end 324 is inserted within the shaft hole 21. An outer circumferential wall of the tapered end 324 includes an annular groove 325, and a locking member 15 is engaged within the annular groove 325 and blocked by a periphery of the shaft hole 21. As such, the pedal body 2 is limited by the locking member 15 and cannot move in a direction away from the first end 11.

In this embodiment, a flexible member 16 (such as glue, gum, adhesive, rubber or the like) is received or filled in the shell member 32, and the flexible member 16 secures the processing module 31 to the shaft 1. The flexible member 16 in the shell member 32 can cover the plurality of circuit boards 313, the flexible member 16 can fill up the gap(s) between the plurality of circuit boards 313 and shaft 1, the flexible member 16 prevents seepage of water into the strain gauges 41 and the processing module 31, and the flexible member 16 prevents the plurality of circuit boards 313 from moving relative to the shaft 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A power pedal, including:
a shaft, including a first end, a second end and a connection section connected between the first end and the second end, the first end being configured to be assembled to a bicycle crank, the connection section including a strain sensing module;
a pedal body, connected to the second end;
a power sensor, including a processing module and a shell member, the processing module being disposed on an outer circumferential wall of the connection section, the processing module including a processing unit and a wireless transmission unit electrically connected to each other, the processing unit being electrically connected to the strain sensing module, the shell member being disposed on the connection section and encompassing the processing module, the shell member including a receiving room, the receiving room being configured to receive a battery which is replaceable and electrically connected to the processing unit,
wherein the first end includes an outer thread, the outer thread is configured to be screwed to the bicycle crank, the shaft includes a flange extending radially and between the connection section and the first end, and an end of the shell member is radially abutted against the flange;
wherein an end of the shell member remote from the first end includes a tapered end, the pedal body includes a shaft hole in which the second end is inserted so that the pedal body is rotatable relative to the second end, and the tapered end is inserted within the shaft hole.

2. The power pedal of claim 1, wherein the processing module further includes at least one circuit board, and the processing unit and the wireless transmission unit is disposed on the at least one circuit board.

3. The power pedal of claim 2, wherein the at least one circuit board includes a plurality of circuit boards, neighboring two of the plurality of circuit boards are connected by a cable, and the plurality of circuit boards are disposed around the connection section.

4. The power pedal of claim 3, wherein one of the plurality of circuit boards is configured to be electrically connected to the battery, and another one of plurality of circuit boards is electrically connected to the strain sensing module.

5. The power pedal of claim 4, wherein the shell member is annular, the shell member includes a sleeving hole, and the sleeving hole is disposed around the processing module and the connection section; an outer circumferential wall of the shell member includes the receiving room, the receiving room includes a cover which is detachable, and the battery is a button battery; an outer circumferential wall of the tapered end includes an annular groove, and a locking member is engaged within the annular groove and blocked by a periphery of the shaft hole; a flexible member is received in the shell member, and the flexible member secures the processing module to the shaft; the strain sensing module includes a plurality of strain gauges, and the plurality of strain gauges are disposed on the connection section.

6. The power pedal of claim 1, wherein the shell member is annular, the shell member includes a sleeving hole, and the sleeving hole is disposed around the processing module and the connection section.

7. The power pedal of claim 1, wherein an outer circumferential wall of the shell member includes the receiving room, and the receiving room includes a cover which is detachable, and the battery is a button battery.

8. The power pedal of claim 1, wherein an outer circumferential wall of the tapered end includes an annular groove, and a locking member is engaged within the annular groove and blocked by a periphery of the shaft hole.

* * * * *